United States Patent
Taylor

(10) Patent No.: US 12,516,850 B1
(45) Date of Patent: Jan. 6, 2026

(54) RENEWABLE GEOTHERMAL ENERGY HARVESTING FROM OFFSHORE WELLS AND METHODS

(71) Applicant: Mark H. Taylor, Gibsland, LA (US)

(72) Inventor: Mark H. Taylor, Gibsland, LA (US)

(*) Notice: Subject to any disclaimer, the term of this patent is extended or adjusted under 35 U.S.C. 154(b) by 0 days.

(21) Appl. No.: 18/804,191

(22) Filed: Aug. 14, 2024

(51) Int. Cl.
  *F24T 10/20* (2018.01)
  *F03G 4/00* (2006.01)
  *F24T 10/10* (2018.01)

(52) U.S. Cl.
  CPC ............. *F24T 10/20* (2018.05); *F03G 4/023* (2021.08); *F03G 4/035* (2021.08); *F24T 10/10* (2018.05)

(58) Field of Classification Search
  CPC ........... F24T 10/20; F24T 10/10; F03G 4/023; F03G 4/035
  USPC .................................. 60/641.2–641.4, 641.7
  See application file for complete search history.

(56) References Cited

U.S. PATENT DOCUMENTS

| | | | |
|---|---|---|---|
| 4,059,959 A | 11/1977 | Matthews | |
| 4,201,060 A * | 5/1980 | Outmans | F03G 7/04 |
| | | | 165/45 |
| 5,372,016 A | 12/1994 | Rawlings | |
| 9,121,393 B2 * | 9/2015 | Schwarck | F24T 10/40 |
| 11,421,516 B2 | 8/2022 | Bowdon et al. | |
| 11,434,880 B1 * | 9/2022 | Taylor | F03G 4/026 |
| 2002/0178723 A1 * | 12/2002 | Bronicki | F01K 17/04 |
| | | | 60/671 |
| 2006/0137349 A1 * | 6/2006 | Pflanz | F28D 20/0052 |
| | | | 60/641.2 |
| 2007/0251237 A1 | 11/2007 | Zachar | |
| 2009/0126923 A1 | 5/2009 | Montgomery | |
| 2009/0321040 A1 | 12/2009 | Poitras | |
| 2010/0000214 A1 * | 1/2010 | Nagurny | F03G 7/05 |
| | | | 60/641.2 |
| 2011/0272166 A1 | 11/2011 | Hunt | |
| 2014/0130498 A1 | 5/2014 | Randolph | |
| 2019/0346181 A1 | 11/2019 | Toews | |
| 2023/0168007 A1 * | 6/2023 | Lakic | F03G 4/069 |
| | | | 60/641.2 |

(Continued)

FOREIGN PATENT DOCUMENTS

| | | |
|---|---|---|
| WO | WO2012/151487 | 11/2012 |
| WO | WO2017/053884 | 3/2017 |
| WO | WO2019/157341 | 8/2019 |

(Continued)

*Primary Examiner* — Hoang M Nguyen
(74) *Attorney, Agent, or Firm* — R. Keith Harrison

(57) ABSTRACT

Offshore renewable geothermal energy harvesting methods suitable for harvesting geothermal energy on an offshore rig for any of various energy applications may include distributing at least one working fluid from at least one offshore rig platform elevated over a water body surface of a water body into thermal contact with at least one subterranean geothermal formation beneath a water body bed of the water body; transferring thermal energy from the subterranean geothermal formation to the working fluid; distributing the working fluid from the subterranean geothermal formation back to the offshore rig platform; distributing the working fluid to at least one thermal application system, the thermal application system configured to utilize the thermal energy to perform work; and utilizing the thermal energy at the thermal application system to perform the work.

18 Claims, 14 Drawing Sheets

(56) References Cited

U.S. PATENT DOCUMENTS

2024/0217628 A1\* 7/2024 Ito .......................... B60L 53/30

FOREIGN PATENT DOCUMENTS

| WO | WO2022/170387 | 8/2022 |
| WO | WO2022/170390 | 8/2022 |

\* cited by examiner

RENEWABLE GEOTHERMAL ENERGY HARVESTING FROM OFFSHORE WELLS AND METHODS

FIELD

Illustrative embodiments of the disclosure relate to renewable energy. More particularly, illustrative embodiments of the disclosure relate to renewable geothermal energy harvesting offshore rigs and methods for harvesting geothermal energy on an offshore rig for any of various energy applications.

BACKGROUND

The background description provided herein is solely for the purpose of generally presenting the context of the illustrative embodiments of the disclosure. Aspects of the background description are neither expressly nor impliedly admitted as prior art against the claimed subject matter.

In recent years, measures have been devised and implemented to combat climate change. A major initiative in this effort has been to increase exploitation of "Green Energy" or renewable energy sources. Green energy implements a range of measures to reduce carbon dioxide ($CO_2$) emissions to the atmosphere.

Among the most common types of green energy are the renewable wind power and solar power. These energy sources, however, may be unpredictable and not continually available. Wind and solar energy technologies typically require extensive infrastructure and the associated maintenance and braking power sources. These drawbacks are setbacks in attempts to mitigate climate change.

Still further, there is continuing interest in maximizing the efficiency and utility of geothermal energy systems. In one sense, the Earth itself may be viewed as potentially forming an exceedingly large, ready-made energy recovery/storage device or reservoir.

Accordingly, renewable geothermal energy harvesting from offshore wells and methods for harvesting geothermal energy on an offshore rig platform for any of various energy applications may be desirable. The geothermal energy harvesting from offshore rigs and methods may be used in the construction of new offshore geothermal wells or retrofitted to existing offshore wells in the oil and gas industry. The conversion of existing oil and gas wells to geothermal recovery wells to produce green energy using the systems and methods will extend the useful life of marginal or depleted wells.

SUMMARY

Illustrative embodiments of the disclosure are generally directed to offshore renewable geothermal energy harvesting methods suitable for harvesting geothermal energy on an offshore rig for any of various energy applications. An illustrative embodiment of the methods may include distributing at least one working fluid from at least one offshore rig platform elevated over a water body surface of a water body into thermal contact with at least one subterranean geothermal formation beneath a water body bed of the water body; transferring thermal energy from the subterranean geothermal formation to the working fluid; distributing the working fluid from the subterranean geothermal formation back to the offshore rig platform; distributing the working fluid to at least one thermal application system, the thermal application system configured to utilize the thermal energy to perform work; and utilizing the thermal energy at the thermal application system to perform the work.

In one aspect, the utilizing the thermal energy at the thermal application system to perform the work may include utilizing the thermal energy of the thermal application system to generate electrical power.

In another aspect, utilizing the thermal energy of the thermal application system to generate the electrical power may include utilizing the thermal energy of the thermal application system to generate the electrical power by driving at least one turbine.

In another aspect, utilizing the thermal energy of the thermal application system to generate the electrical power may include utilizing the thermal energy of the thermal application system to generate the electrical power using at least one Organic Rankine Cycle. In another aspect, at least one battery may be recharged using the electrical power.

In another aspect, the battery may be relocated from the offshore rig platform to at least one cargo transport vessel for transport of the battery on the water body.

In another aspect, relocating the battery from the offshore rig platform to the cargo transport vessel may include relocating the battery from the offshore rig platform to the cargo transport vessel using at least one battery loading/unloading crane.

In another aspect, the battery may be transported to a land-based facility on the cargo transport vessel.

In another aspect, the offshore renewable geothermal energy harvesting methods may include distributing at least one working fluid from at least one offshore rig platform elevated over a water body surface of a water body into thermal contact with at least one subterranean geothermal formation beneath a water body bed of the water body; transferring thermal energy from the subterranean geothermal formation to the working fluid; distributing the working fluid from the subterranean geothermal formation back to the offshore rig platform; distributing the working fluid to at least one thermal application system on the offshore rig platform, the thermal application system configured to utilize the thermal energy to generate electrical power; utilizing the thermal energy at the thermal application system to generate the electrical power; and distributing the electrical power to at least one electrical system of at least one operational offshore rig.

Illustrative embodiments of the disclosure are generally directed to offshore renewable geothermal energy harvesting rigs configured to harvest thermal energy from a subterranean geothermal formation beneath a water body bed of a water body and perform work using the thermal energy. An illustrative embodiment of the rig may include an offshore rig platform deployed over a water body surface of the water body. A renewable geothermal energy harvesting system may include a wellhead at the offshore rig platform. A well casing may extend downwardly from the wellhead through the offshore rig platform and the water body bed, respectively, into and in thermal contact with the subterranean geothermal formation. A fluid flow conduit may extend into the well casing. The fluid flow conduit may be disposed in fluid communication with the wellhead. A well annulus may be disposed between the fluid flow conduit and the well casing. The well annulus may be disposed in fluid communication with the wellhead. A working fluid supply may be disposed in fluid communication with the wellhead. The working fluid supply may be configured to contain at least one working fluid comprising refrigerant. At least one thermal application system may be on the offshore rig offshore rig platform. The thermal application system may be disposed in fluid communication with the wellhead. The thermal application system may be configured to utilize the thermal energy to perform the work. The wellhead may be configured to distribute the working fluid from the water body bed of the water body into thermal contact with the subterranean geothermal formation through a first one of the fluid flow conduit and the well annulus and from the subterranean geothermal formation to the thermal application system through a second one of the fluid flow conduit and the well annulus.

In another aspect, the thermal application system may be configured to utilize the thermal energy to generate electrical power.

In another aspect, the thermal application system may include at least one turbine.

In another aspect, at least one battery charging port may electrically interface with the thermal application system. At least one battery loading/unloading crane may be disposed on the offshore rig platform. The battery loading/unloading crane may be operable to transfer the battery to and from the battery charging port.

In another aspect, at least one operational offshore rig may include at least one rig electrical system which electrically interfaces with the thermal application system.

BRIEF DESCRIPTION OF THE DRAWINGS

Illustrative embodiments of the disclosure will now be described, by way of example, with reference to the accompanying drawings, in which.

Like reference numbers refer to like parts throughout the several views of the drawings.

DETAILED DESCRIPTION

Figure 1:
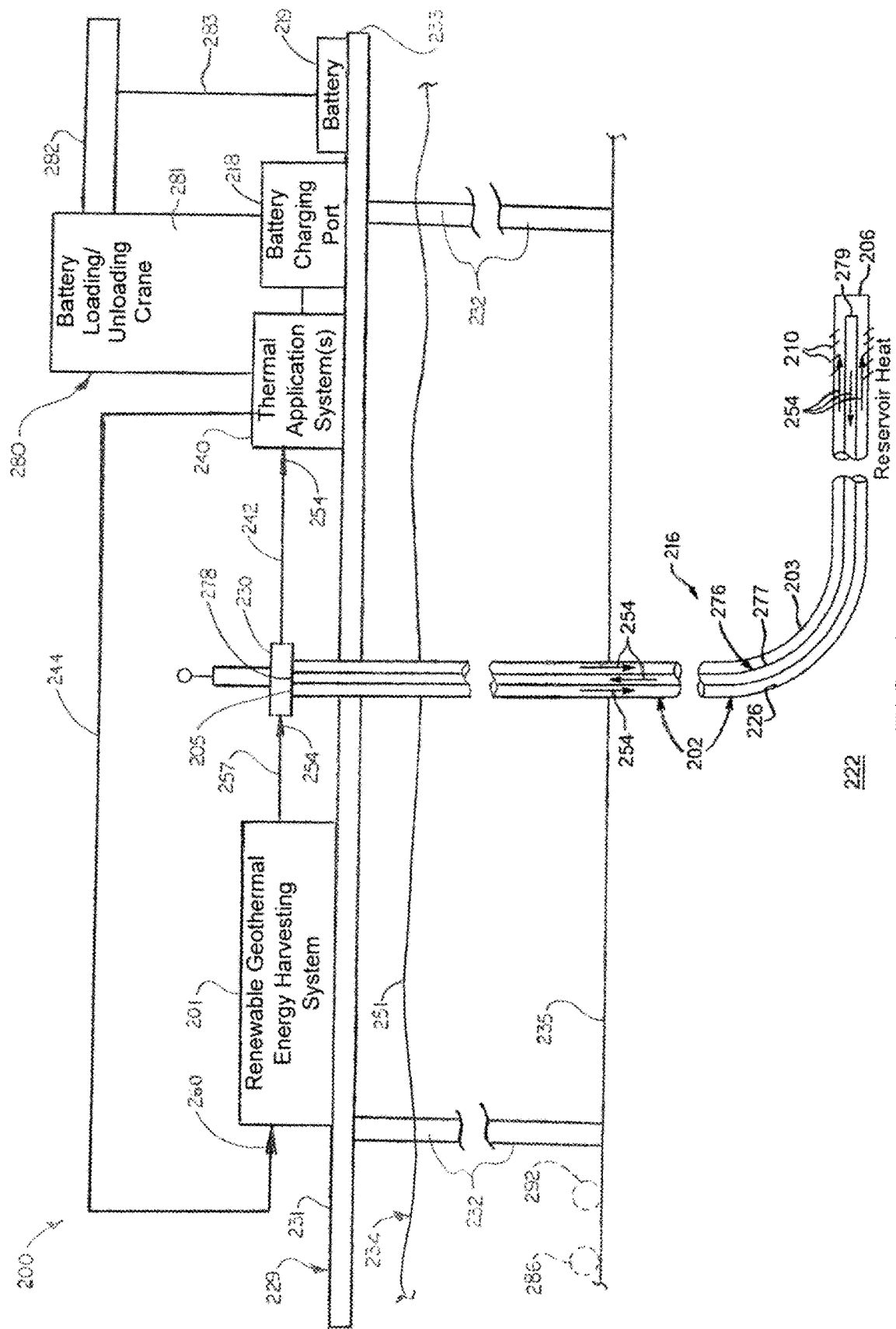
FIG. 1 is a functional side view block diagram of an illustrative embodiment of the renewable geothermal energy harvesting offshore rigs, more particularly illustrating exemplary application of the rig in recharging of a battery.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition terms "comprise", "comprises", "comprising", "include", "includes", "including", "is", "has", "having" or the like means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment. Throughout the written description, drawings and claims appended hereto, unless otherwise noted, it shall be recognized and understood that each embodiment of the described, illustrated and claimed subject matter may comprise, consist essentially of, or consist of any component, element or combination of components or elements set forth herein.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction.

Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

The term "or combinations thereof as used herein refers to all permutations and combinations of the listed items preceding the term. For example, "A, B, C, or combinations thereof is intended to include at least one of A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Figure 2:
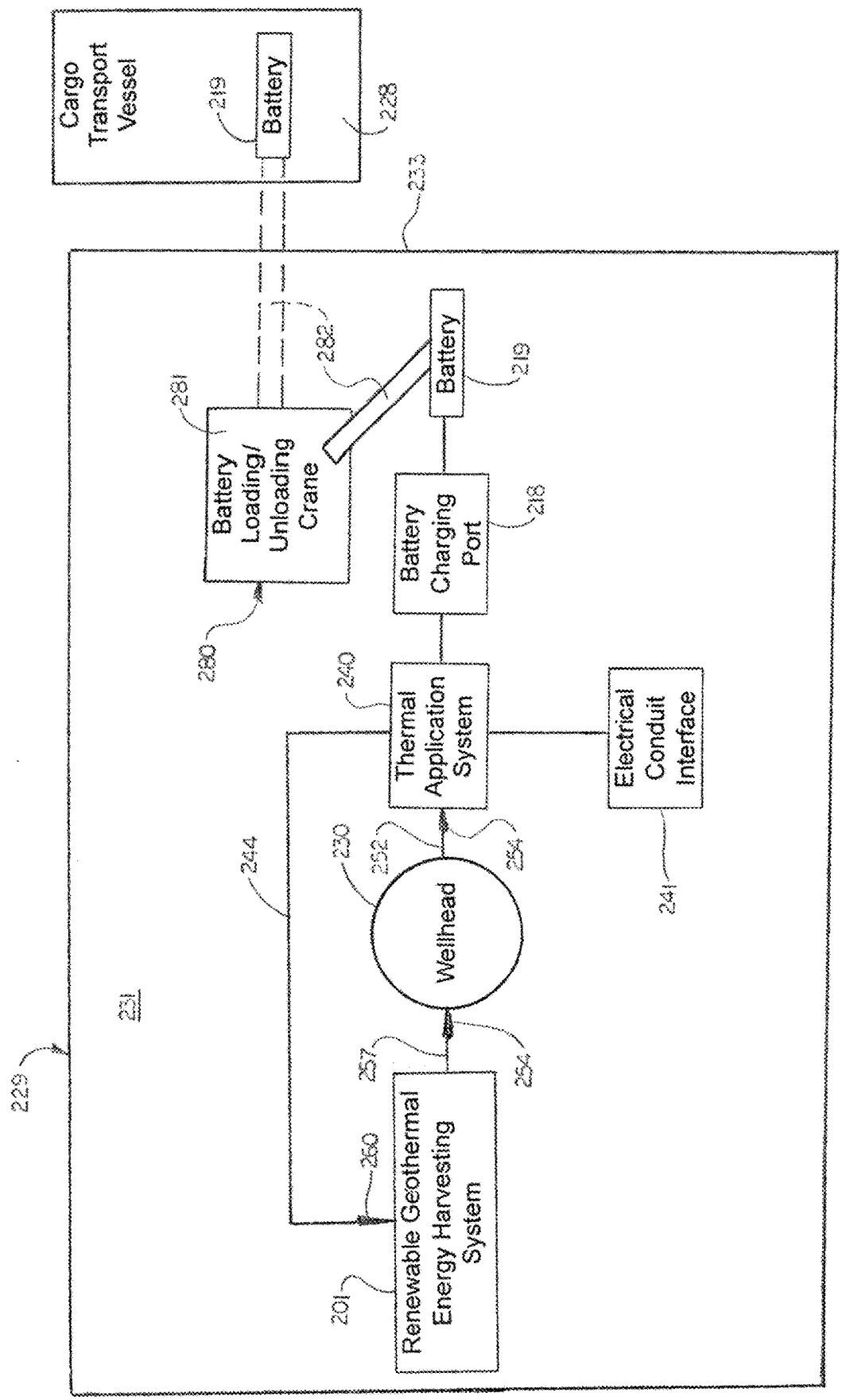
FIG. 2 is a functional top view block diagram of the illustrative renewable geothermal energy harvesting offshore rig illustrated in FIG. 1.
Figure 3:
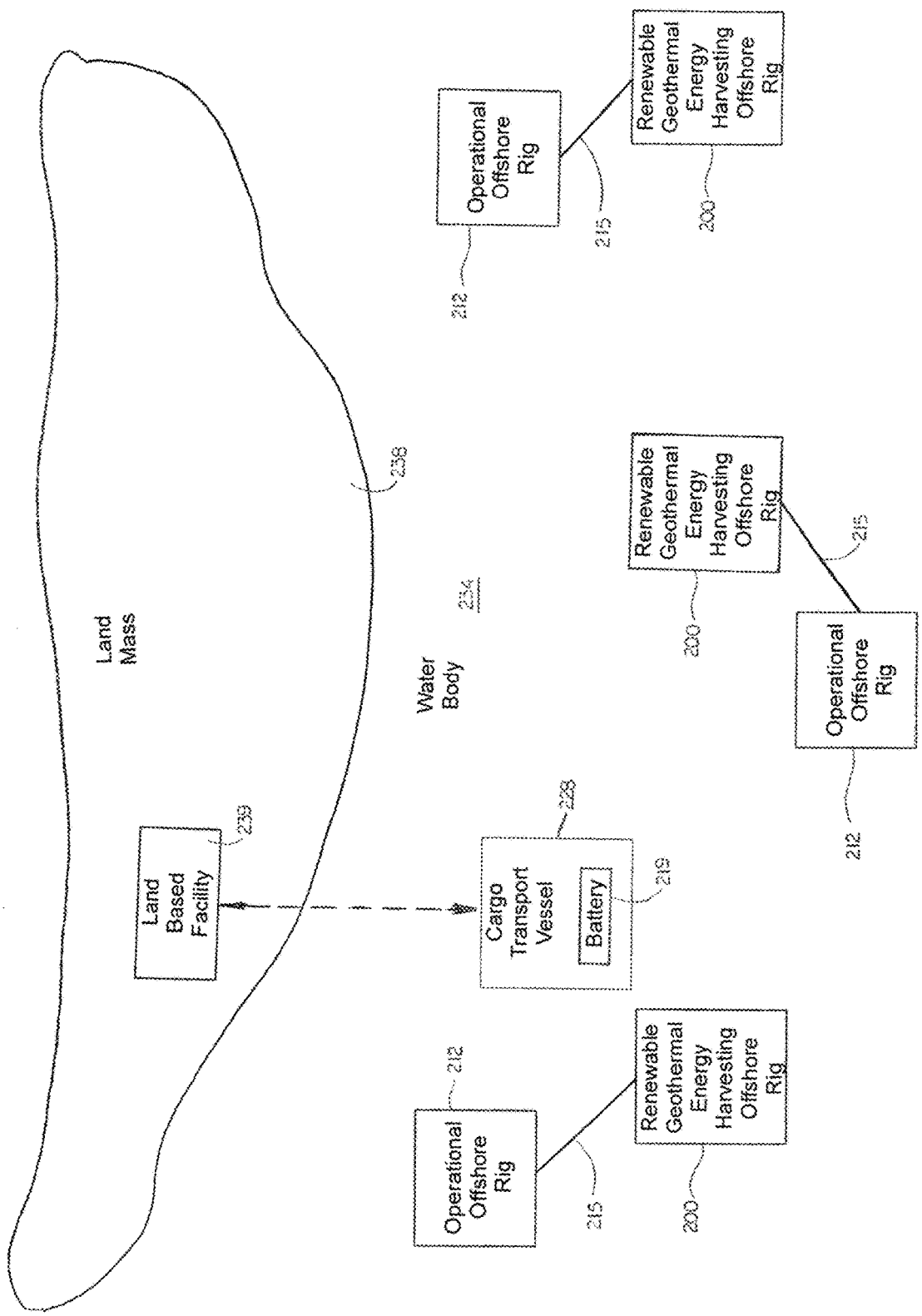
FIG. 3 is a top view of a land mass adjacent to a water body with multiple operational offshore rigs in the water body and a renewable geothermal energy harvesting offshore rig disposed in electrical communication with each operational offshore rig according to some applications of the rigs, additionally illustrating a cargo transport vessel powered by a recharged battery on the water body to a land based facility on the land mass.

Referring initially to FIGS. 1-10 of the drawings, an illustrative embodiment of the renewable geothermal energy harvesting offshore rigs, hereinafter rig, is generally indicated by reference number 200 in FIG. 1. As illustrated in FIG. 3 and will be hereinafter described, in typical application, one or more rigs 200 may be deployed on an ocean, gulf, sea or other large water body 234 at a distance from a land mass 238. The rigs 1 may be interspersed with one or more operational offshore rigs 212 on the water body 234. The operational offshore rigs 212 may be actively utilized in the production of hydrocarbons (oil and gas). Each operational offshore rig 212 may have a standard or conventional offshore hydrocarbon production rig design and may include facilities to extract and process petroleum and/or natural gas that lie in the geothermal formation 222 beneath the water body bed 235 of the water body 234.

Each rig 200 may be configured to harvest geothermal energy from a subterranean geothermal formation 222 (FIG. 1) and utilize the geothermal energy to perform work such as generating electrical power, for example and without limitation. In some applications, each rig 200 may be utilized to recharge at least one battery 219. The recharged battery 219 may be used to provide electrical power for marine vehicles on the water body 234. For example and without limitation, in some applications, the recharged battery 219 may be used to provide electrical power to an electric cargo transport vessel 228 which may transport cargo to and/or from a land based facility 239 on the land mass 238. The cargo transport vessel 228 may be of any type or class of vessel which is usable to transport cargo on the water body 234. For example and without limitation, in some applications, the cargo transport vessel 228 may be a supply vessel which provides supplies from the land based facility 239 to one or more operational offshore rig or rigs 212. The recharged battery 219 may provide sufficient electrical power to facilitate the return trip of the cargo transport vessel 228 from the rig 200 back to the land based facility 239 for reloading of the cargo transport vessel 228 with another supply of cargo or supplies.

As further illustrated in FIG. 3, in some applications, an electrical conduit 215 may electrically connect at least one operational offshore rig 212 to the rig 200. The rig 200 may thus provide electrical power for continued operation of at least some of the functions of the operational offshore rig 212, typically as will be hereinafter described.

As illustrated in FIGS. 1 and 2 and will be hereinafter described, the rig 200 may be configured to harvest thermal energy from a subterranean geothermal formation 222 (FIG. 1) beneath a water body bed 235 of the water body 234 and perform work using the thermal energy. The rig 200 may include an offshore rig platform 229. As illustrated in FIG. 1, the offshore rig platform 229 may be deployed over a water body surface 251 of the water body 234. In some embodiments, rig platform supports 232 may engage the water body bed 235 and support the offshore rig platform 229 over the water body surface 251. In some embodiments, the offshore rig platform 229 may have an artificial island or float design in which the offshore rig platform 229 is buoyant and at least partially floats on the water body surface 251. A renewable geothermal energy harvesting system 201 may include a wellhead 230 at the offshore rig platform 229. A well casing 202 may extend downwardly from the wellhead 230 through the rig platform 229, the water body 234 and the water body bed 235, respectively. The well casing 202 may extend beneath the water body bed 235 and into and in thermal contact with the subterranean geothermal formation 222.

Figure 4:
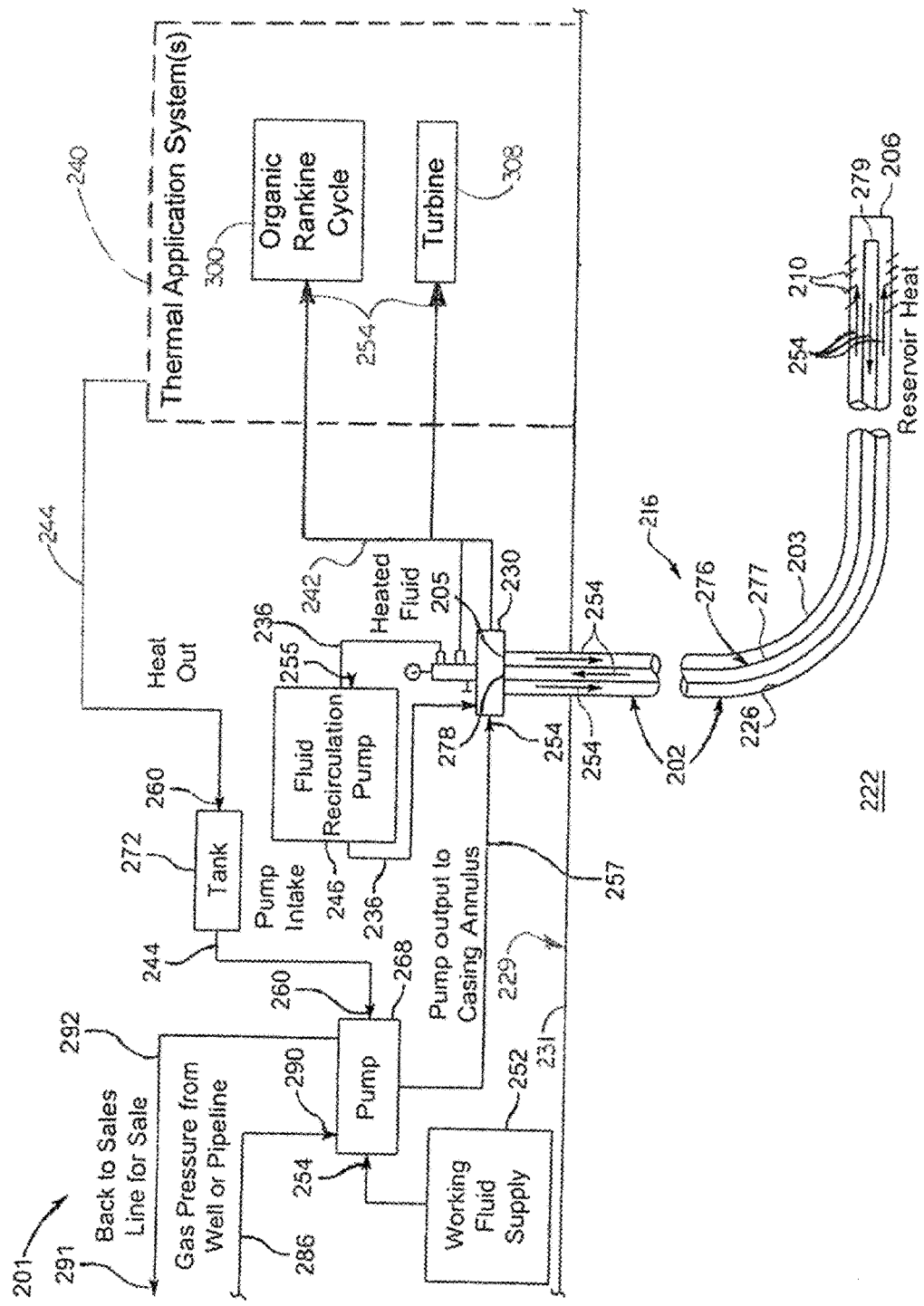
FIG. 4 is an illustrative renewable geothermal energy harvesting system suitable for application of the renewable geothermal energy harvesting offshore rigs.

A fluid flow conduit 276 may extend into the well casing 202. The fluid flow conduit 276 may be disposed in fluid communication with the wellhead 230. A well annulus 226 may be disposed between the fluid flow conduit 276 and the well casing 202. The well annulus 226 may be disposed in fluid communication with the wellhead 230. As illustrated in FIG. 4, a working fluid supply 252 may be disposed in fluid communication with the wellhead 230. The working fluid supply 252 may be configured to contain at least one working fluid 254. In some embodiments, the working fluid 254 may include at least one refrigerant or a combination of refrigerants.

As illustrated in FIG. 1, at least one thermal application system 240 may be on the offshore rig platform 229. The thermal application system 240 may be disposed in fluid communication with the wellhead 230. The thermal application system 240 may be configured to utilize the thermal energy to perform the work. In typical operation of the renewable geothermal energy harvesting system 201, which will be hereinafter described, the wellhead 230 may be configured to distribute the working fluid 254 from the rig platform 229 into thermal contact with the subterranean geothermal formation 222 through a first one of the fluid flow conduit 276 and the well annulus 226 and from the subterranean geothermal formation 222 to the thermal application system 240 on the rig platform 229 through a second one of the fluid flow conduit 276 and the well annulus 226.

As will be hereinafter described, the renewable geothermal energy harvesting system 201 may be suitably configured to harvest native thermal energy from the subterranean geothermal formation 222 to the working fluid 254 and heat the working fluid 254 to a selected target temperature. The harvested thermal energy from the heated working fluid 254 may be utilized or used in the thermal application system 240 to operate at least one Organic Rankine Cycle (ORC) system 300 (FIG. 4), drive at least one turbine 308 and/or provide working energy for electrical power generation, heating, cooling, storage, hydrogen production, and/or other purposes. The thermally exhausted working fluid 254 may be returned from the thermal application system 240 to the system 201, through a fluid return conduit 244, as a return fluid stream 260 for another cycle through the system 201 and the thermal application system 240 in a continuous and repeating loop. Accordingly, in some embodiments, the renewable geothermal energy harvesting system 201 and the thermal application system 240 may form separate closed loops which may thermally intersect each other, typically via thermal conduction, to utilize the thermal energy in the working fluid 254 to perform work, typically as will be hereinafter described.

The temperature of the geothermal formation 222 may depend on various factors such as the location, depth and geological content and density. A typical temperature range of the geothermal formation 222 at depths of about 760 to 4,880 meters (2,500 to 16,000 feet) may include temperatures between about 65° C. and about 150° C. (150° F. and 300° F.). The subterranean well casing 202 of the system 201 may be deployed in a drilled wellbore (not numbered) which extends into the subterranean geothermal formation 222.

In some applications, the subterranean well casing 202 may be part of an existing well, accessed by the rig platform 229, in the oil and gas industry, or may be a newly installed well which is dedicated to use as the system 201. In the former case, the conversion of existing oil and gas wells to geothermal recovery wells to produce green energy using the systems and methods will extend the useful life of marginal or depleted wells. In the latter case, the wellbore may be drilled and the casing 202 installed as part of a dedicated geothermal well.

The subterranean well casing 202 may have any length necessary to reach the subterranean geothermal formation 222 from the platform floor 231 of the rig platform 229. The wellbore in which the well casing 202 is installed may have any trajectory and may be vertical, horizontal, or any angle between vertical and horizontal at any point or points along its length.

The well casing 202 may have a typically steel well casing wall 203 with a proximal casing end 205 which terminates at or near the platform floor 231 of the rig platform 229 and a distal casing end 206 which terminates within the geothermal formation 222. In some embodiments, a well casing lining (not illustrated), typically cement or grout, may line the outer surface of the well casing wall 203. As illustrated in FIG. 1, in some embodiments, such as in the case of an existing depleted oil or gas well, casing perforations 210 may extend through the well casing wall 203 of the well casing 202. In implementation of the system 201, the casing perforations 210 may be closed or sealed off. In some embodiments, such as in the case of a well drilled for the dedicated purpose of the renewable geothermal energy harvesting systems and methods, the casing perforations 210 may be omitted.

In some embodiments, the fluid flow conduit 276 may include a tubing string, for example and without limitation. The fluid flow conduit 276 may extend from the platform floor 231 of the rig platform 229 into the well casing 202. The fluid flow conduit 276 may have a fluid flow conduit wall 277 with a proximal conduit end 278 disposed at or near the platform floor 231 of the rig platform 229 and a distal conduit end 279 disposed in the well casing 202. The fluid flow conduit wall 277 may be fabricated of a material or combination of materials having a low specific heat or high thermal conductivity. In some embodiments, thermal insulation (not illustrated) may surround the fluid flow conduit wall 277 of the fluid flow conduit 276.

The well annulus 226 may be formed by and between the interior surface of the well casing wall 203 and the exterior surface of the fluid flow conduit 276. The distal conduit end 279 of the fluid flow conduit 276 may be open to establish fluid communication between the well annulus 226 and the conduit interior of the fluid flow conduit 276.

The wellhead 230 may be disposed in fluid communication with the proximal conduit end 278 of the fluid flow conduit 276 and the well annulus 226 at the platform floor 231 of the rig platform 229. The wellhead 230 may facilitate fluid communication between the well annulus 226 and the fluid flow conduit 276 with at least some of the various functional components of the system 201, which will be hereinafter described. The wellhead 230 may include conduits and valves which facilitate controlled and regulated flow of the working fluid 254 throughout the system 201, which will be hereinafter described, as well as pressure gauges which indicate well pressures and the like.

As illustrated in FIG. 4, at least one working fluid supply 252 may be configured to contain a supply of the working fluid 254. The working fluid 254 may include at least one refrigerant and/or other fluid or combination of fluids having a high specific heat or high boiling point. The working fluid supply 252 may be disposed in fluid communication with the well annulus 226 typically through at least one working fluid supply pump 268. Accordingly, as further illustrated in FIG. 4, in some applications of the system 201, by operation of the working fluid supply pump 268, the working fluid 254 may pumped from the working fluid supply 252 into the well annulus 226 through a fluid introduction conduit 257 which may be connected to the wellhead 230. In some embodiments, the working fluid supply pump 268 may include an electric motor (not illustrated) which facilitates pumping of the working fluid 254 from the working fluid supply 252 through the fluid introduction conduit 257. In some embodiments, the working fluid supply pump 268 may be configured such that the kinetic energy of the flowing inlet gas stream 290 of natural gas in a natural gas pipeline 286 may substitute for the electric motor to provide the pumping of the working fluid 254 throughout the system 201, typically as will be hereinafter described.

In some embodiments, the thermal application system 240 may be disposed in direct (without intermediary storage facilities) fluid communication with the fluid manifold or wellhead 230, typically through at least one distribution conduit 242. The thermal application system 240 may be disposed in direct fluid communication with the wellhead 230 and may be configured to utilize the thermal energy. As used herein, "utilize the thermal energy" and like phrases mean that the thermal application system 240 is configured to use the thermal energy to perform work directly or to convert the thermal energy to electrical energy. The electrical energy may be used to perform work and/or stored for later use. For example and without limitation, as illustrated in FIG. 4, in some embodiments, the thermal application system 240 may include at least one Organic Rankine Cycle (ORC) system 300, turbine 308 and/or other system which utilizes the thermal energy harvested by the system 201 to perform work such as for electrical power generation, storage and/or other purposes, typically as will be hereinafter described. In some embodiments, the thermal application system 240 may include a heat gas cooling cycle system (not illustrated) which utilizes gas heat to cool fluids. For example and without limitation, in some embodiments, the heat gas cooling cycle system may include a natural gas absorption cooling system which utilizes a cycle of condensation and evaporation using natural gas to produce cooling. The condensation and evaporation cycle of the absorption process may be driven by the heat captured from the subterranean geothermal formation 222. Absorption systems may be available as chillers or chiller/beaters and may be powered by the harvested heat. The heat gas cooling cycle system may be particularly suitable for cooling commercial facilities on the rig 200 and/or on an operational offshore rig 212. The heat gas cooling cycle system and other systems which may be applicable for the thermal application system 240 are disclosed in U.S. application Ser. No. 18/075,120, filed Dec. 5, 2022, and U.S. application Ser. No. 17/894,546, filed Aug. 24, 2022, each of which applications is hereby incorporated by reference herein in its entirety for all purposes.

In some embodiments, a recirculation conduit 236 may have an inlet end which is disposed in fluid communication with the fluid flow conduit 276 and an outlet end which is disposed in fluid communication with the well annulus 226, typically through the wellhead 230. A fluid recirculation pump 246 may be disposed in fluid communication with the recirculation conduit 236. The fluid recirculation pump 246 may be operable to pump a recirculation stream 255 of the heated working fluid 254 from the proximal conduit end 278 of the fluid flow conduit 276 through the recirculation conduit 236 to the well annulus 226 to impart additional heating to the working fluid 254 prior to distribution of the working fluid 254 to the thermal application system 240. Alternatively, the fluid recirculation pump 246 may be operable to pump the recirculation stream 255 of the heated working fluid 254 first through the fluid flow conduit 276 and then through the well annulus 226.

In some embodiments, a natural gas pipeline 286 and a gas sale line 292, such as ocean floor lines, for example and without limitation, may traverse the water body bed 235 (FIG. 1) of the water body 234 and may be located in proximity to the system 201. The natural gas pipeline 286 may include a higher pressure natural gas line and/or a natural gas producing well. The routed natural gas pressured natural gas pipeline 286 may be connected to the inlet and exhaust ports of the working fluid supply pump 268 in order to provide kinetic energy to the pump 268. Accordingly, only the kinetic energy from natural gas flowing from the natural gas pipeline 286 may be used to operate the working fluid supply pump 268. A fluid return conduit 244 may connect the working fluid supply 252 and/or the working fluid supply pump 268 to the thermal application system 240. Accordingly, in typical operation of the system 201, an inlet gas stream 290 of natural gas may flow from the natural gas pipeline 286 to the working fluid supply pump 268. The kinetic energy from the flow pressure of the inlet gas stream 290 may operate the working fluid supply pump 268 of the working fluid supply 252. A return fluid stream 260 of the working fluid 254 may flow from the thermal application system 240 back to the working fluid supply pump 268 typically through the return fluid conduit 244. At the working fluid supply pump 268, the post-pump natural gas may be routed back to the natural gas pipeline 286, to the gas producing well and/or to the gas sale line 292 as a return gas stream 291. Accordingly, none of the natural gas is consumed or exhausted to the atmosphere. The inlet gas stream 290 may continue to flow from the natural gas pipeline 286 to the working fluid supply pump 268 for continued operation of the working fluid supply pump 268 and circulation of the working fluid 254 through the system 201.

In some embodiments, a recirculation conduit 236 may have an inlet end which is disposed in fluid communication with the fluid flow conduit 276 and an outlet end which is disposed in fluid communication with the well annulus 226, typically through the wellhead 230. A fluid recirculation pump 246 may be disposed in fluid communication with the recirculation conduit 236. The fluid recirculation pump 246 may be operable to pump the heated working fluid 254 from the proximal conduit end 278 of the fluid flow conduit 276 through the recirculation conduit 236 to the well annulus 226 to impart additional heating to the working fluid 254 prior to distribution of the working fluid 254 to the thermal application system 240.

As illustrated in FIG. 4, in typical application of the system 201, a supply of the working fluid 254 may be placed in the working fluid supply 252. By operation of the working fluid supply pump 268, the working fluid 254 may be pumped from the working fluid supply 252 through the fluid introduction conduit 257 and wellhead 230, respectively, into the well annulus 226, and traverse at least a portion of the length of the well casing 202.

As the working fluid 254 flows through the well annulus 226 toward the distal casing end 206 of the well casing 202, thermal energy is transferred from the geothermal formation 222 through the well casing wall 203 to the working fluid 254. As it approaches the distal casing end 206 of the well casing 202, the heated working fluid 254 may flow from the well annulus 226 and enter the fluid flow conduit 276 through the distal conduit end 279. The heated working fluid 254 flows from the distal conduit end 279 through the fluid flow conduit 277 to the proximal conduit end 278. As it flows through the fluid flow conduit 277, some thermal energy may be transferred from the working fluid 254 in the fluid flow conduit 277 to the working fluid 254 in the well annulus 226 to preheat the working fluid 254 in the well annulus 226.

Figure 5:
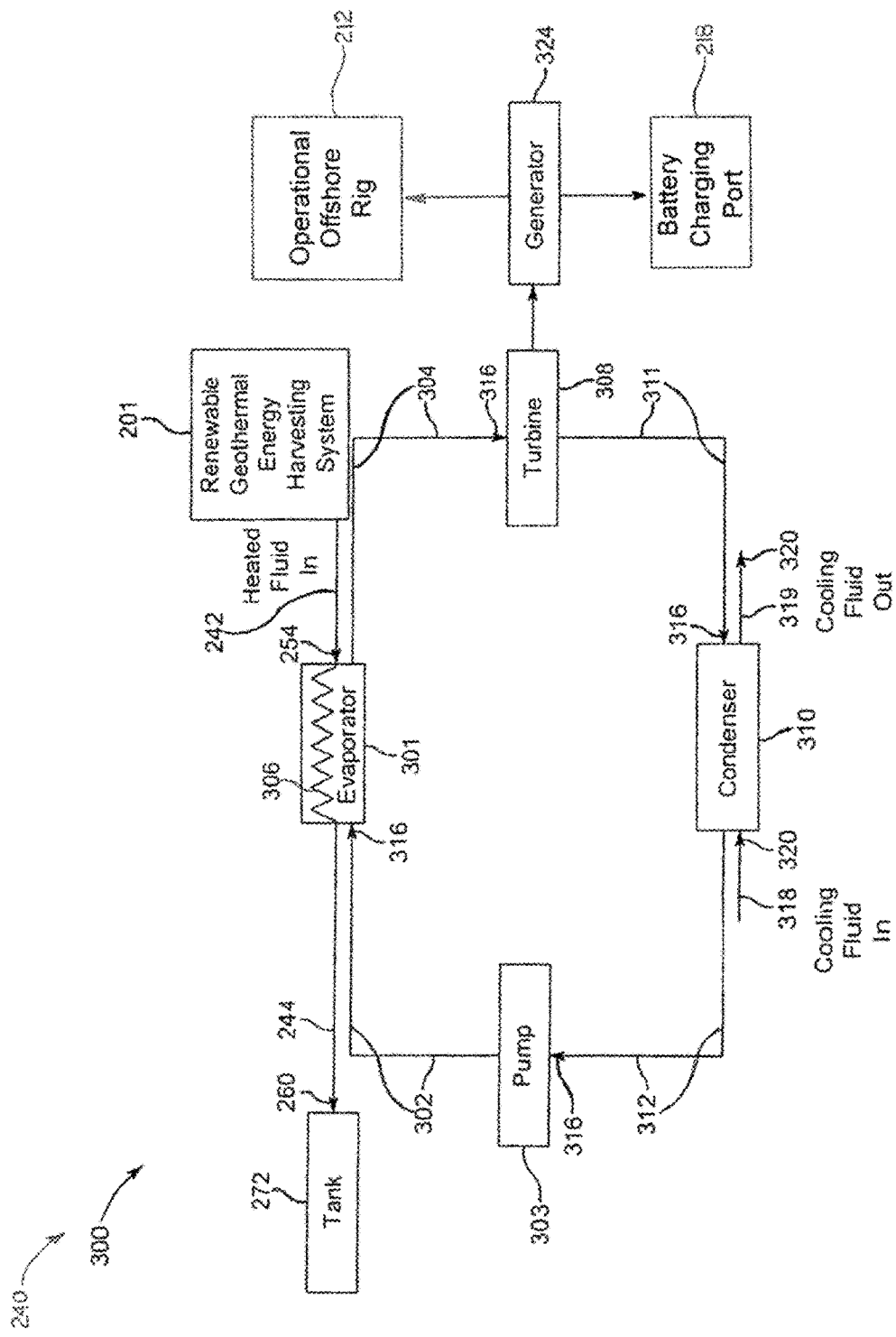
FIG. 5 is a functional block diagram of a typical thermal application system having an Organic Rankine Cycle (ORC) system thermally interfacing with the renewable geothermal energy harvesting system according to some illustrative embodiments of the renewable geothermal energy harvesting offshore rigs.
Figure 6:
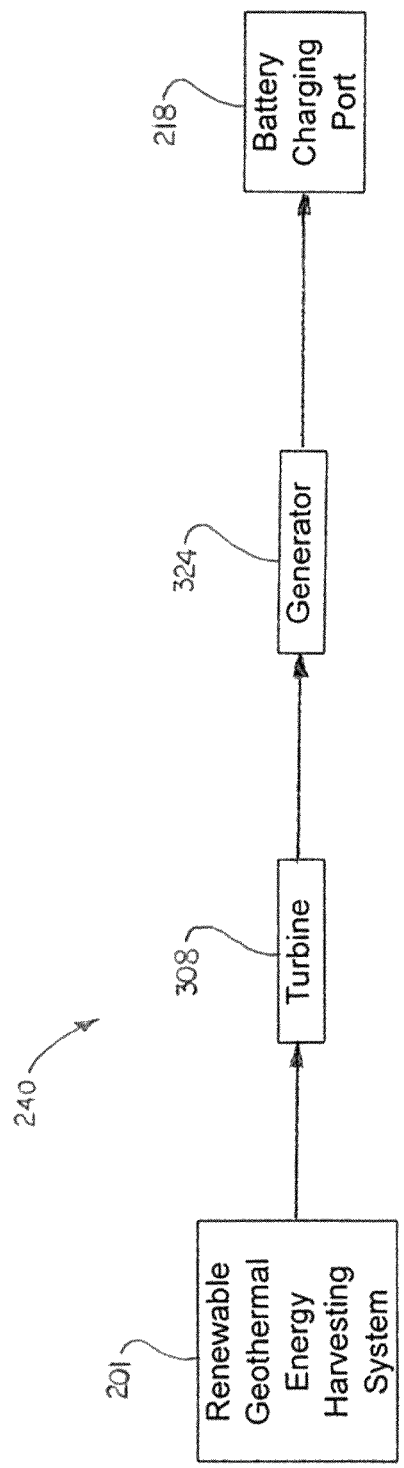
FIG. 6 is a functional block diagram of a typical thermal application system having a turbine thermally interfacing with the renewable geothermal energy harvesting system, a generator electrically interfacing with the turbine and a battery charging port electrically interfacing with the generator according to some illustrative embodiments of the renewable geothermal energy harvesting offshore rigs.

The wellhead 230 may distribute at least one application stream of the heated working fluid 254 from the proximal conduit end 278 of the fluid flow conduit 276 typically through the distribution conduit 242 to the thermal application system 240. In some applications, the thermal energy from the application stream of the heated working fluid 254 may be used to drive at least one turbine 308 and/or other thermal application at the thermal application system 240 for electrical power generation, storage and/or other purposes. For example and without limitation, as illustrated in FIG. 5, in some applications, the thermal application system 240 may include the ORC system 300. As illustrated in FIG. 6, in some applications, the thermal application system 240 may include the turbine 308 and the electrical generator 324. In some applications, the thermal application system 240 may include the heat gas cooling system (not illustrated) which utilizes heat gas to cool fluids such as natural gas. The cooled fluids may be used for cooling enclosures and/or facilities on the rig platform 229 and/or on one or more operational offshore rigs 212, for example and without limitation.

As further illustrated in FIG. 4, in some applications, the thermal application system 240 may include the ORC system 300. As illustrated in FIG. 5, The ORC system 300 may utilize the thermal heat of the heated working fluid 254 in at least one organic Rankine cycle to generate electrical power via the electrical generator 324. Accordingly, the ORC system 300 may include an evaporator 301. The evaporator 301 may provide the thermal intersection point between the closed loop of the system 201 and the closed loop of the organic Rankine cycle 300. The distribution conduit 242 and the fluid return conduit 244 (FIG. 4) of the renewable geothermal energy harvesting system 201 may be disposed in fluid communication with the evaporator 301. Accordingly, the evaporator 301 may be configured to accommodate flow of the heated working fluid 254 as the heated working fluid 254 flows from the distribution conduit 242 to the fluid return conduit 244.

An evaporator inlet line 302 and an evaporator outlet line 304 may be disposed in fluid communication with the evaporator 301. The evaporator 301 may be configured to accommodate flow of a cycle fluid 316 as the cycle fluid 316 flows from the evaporator inlet line 302 to the evaporator outlet line 304. The evaporator 301 may include a heat-transmissible fluid barrier (not illustrated) which separates the fluid flow paths of the heated working fluid 254 and the cycle fluid 316 through the evaporator 301. In some embodiments, the evaporator 301 may include a heat-transmissible spiral conduit 306 which is disposed in fluid communication with the distribution conduit 242 and the fluid return conduit 244. Accordingly, the evaporator 301 may be configured to facilitate transfer of thermal energy from the heated working fluid 254 to the cycle fluid 316 as the heated working fluid 254 flows through the spiral conduit 316 in the evaporator 301 and the cycle fluid 316 flows through the evaporator 301 typically in opposite directions on respective sides of the heat-transmissible barrier or the wall of the spiral conduit 316.

The cycle fluid 316 may include at least one volatile fluid having an evaporation temperature which is lower than or equal to the temperature of the heated working fluid 254. The constitution and characteristics of the cycle fluid 316 may be selected such that the cycle fluid 316 evaporates, or changes from the fluid phase to the gaseous phase, as it traverses the evaporator 301 from the evaporator inlet line 302 to the evaporator outlet line 304. The cycle fluid 316 is typically an organic, high molecular mass fluid with a liquid-vapor phase change, or boiling point, occurring at a lower temperature than the water-steam phase change. Fluids having characteristics which are optimal for the cycle fluid 316 may include fluids which exhibit an isentropic saturation vapor curve and have a low freezing point, high stability temperature, high heat of vaporization and density, low environmental impact, safety, good availability, low cost, and acceptable pressures. Non-limiting examples of fluids which may be suitable for the cycle fluid 316 may include CFCs, HCFCs, HFCs, HCs, and PFCs.

A cycle fluid pump 303 may have an outlet which is disposed in fluid communication with the evaporator 301 through the evaporator inlet line 302. A condenser 310 may be disposed in fluid communication with an inlet of the cycle fluid pump 303 typically through a condenser outlet line 312. A condenser inlet line 311 may be disposed in fluid communication with the condenser 310. The condenser 310 may facilitate flow of the cycle fluid 316 as the cycle fluid 316 flows from the condenser inlet line 311 to the condenser outlet line 312.

A cooling fluid inlet line 318 and a cooling fluid outlet line 319 may be disposed in fluid communication with the condenser 310. The cooling fluid inlet line 318 and the cooling fluid outlet line 319 may facilitate flow of a cooling fluid 320 into and out of, respectively, the condenser 310. The condenser 310 may be configured to condense the cycle fluid 316 from the gaseous state back to the liquid state as the cooling fluid 320 flows from the condenser inlet line 311, through the condenser 310 to the condenser outlet line 312 and absorbs thermal energy from the cycle fluid 316 in the condenser 310.

At least one turbine 308 may have an inlet which is disposed in fluid communication with the evaporator outlet line 304 and an outlet which is disposed in fluid communication with the condenser inlet line 311. The turbine 308 may be configured to convert thermal energy into rotational mechanical energy as the heated gaseous cycle fluid 316 flows from the evaporator outlet line 304 to the condenser inlet line 311, typically in the conventional manner. At least one electrical generator 324 may be drivingly engaged by the turbine 308. The electrical generator 324 may be configured to convert the rotational mechanical energy of the turbine 308 into electrical energy, typically in the conventional manner.

In some embodiments, an electrical distribution and sales system or network (not illustrated) may electrically interface with the electrical generator 324. Accordingly, electrical power which is generated by the electrical generator 324 may be distributed to the electrical distribution and sales system or network for sales, distribution, and use.

As illustrated in FIG. 4, in some embodiments, at least one turbine 308 may be disposed in fluid communication with the distribution conduit 242. The turbine 308 may be configured to convert thermal energy from the heated working fluid 254 into electrical energy, typically according to the knowledge of those skilled in the art.

As illustrated in FIGS. 1 and 2, at least some or all of the components of the renewable geothermal energy harvesting system 201 and/or of the thermal application system 240 may be supported on the platform floor 231 of the rig platform 229. In some embodiments, any or all of the various components of either or both systems may be portable, as disclosed in U.S. application Ser. No. 18/752,128, filed Jun. 24, 2024, which application is hereby incorporated by reference herein in its entirety for all purposes. In some embodiments, some or all of the components of the renewable geothermal energy harvesting system 201 and/or of the thermal application system 240 may be bolted, welded and/or fixedly or releasably mounted on the rig platform 229 typically according to the knowledge of those skilled in the art.

As illustrated in FIGS. 1 and 2, in some embodiments, at least one battery charging port 218 may electrically interface with the thermal application system 240. Accordingly, electrical power generated by the thermal application system 240 may be distributed to the battery charging port 218. The battery charging port 218 may be configured to electrically and detachably electrically interface with at least one rechargeable battery 219. Accordingly, the battery charging port 218 may include positive and negative interfaces (not illustrated) which are configured to interface with respective electrical poles of the battery 219. The battery charging port 218 may be configured to electrically recharge the electrically depleted battery 219 in operation of the renewable geothermal energy harvesting system 201 and the thermal application system 240. In some applications, the battery 219 may be of any type or class of battery which is usable to supply electrical power for operation of marine vehicles (not illustrated) on the water body 234. In other applications, the battery 219 may be of any type or class of battery which is usable to supply electrical power for any of a variety of alternative applications.

As further illustrated in FIGS. 1 and 2, in some embodiments, at least one battery loading/unloading crane 280 may be disposed on the rig platform 229. The battery loading/unloading crane 280 may be suitably positioned on the rig platform 229 and operable to transfer the electrically depleted battery 219 first from a cargo transport vessel 228 to the battery charging port 218 and then transfer the electrically charged battery 219 from the battery charging port 218 to the cargo transport vessel 228 typically for transport of the battery 219 on the water body 234 and/or electrical powering of the cargo transport vessel 228. For example and without limitation, as illustrated in FIGS. 1, 2 and 8-10, in some embodiments, the rig platform 229 may include at least one battery loading/unloading dock 233. The battery loading/unloading dock 233 may be disposed along or adjacent to an edge of the rig platform 229. The battery loading/unloading dock 233 may include suitable docking facilities (not illustrated) which facilitate docking of the cargo transport vessel 228 at the battery loading/unloading dock 233. The battery loading/unloading crane 280 may be positioned in suitable proximity to the battery loading/unloading dock 233 and configured to facilitate transfer of the battery 219 between the battery charging port 218 and the cargo transport vessel 228 as the cargo transport vessel 228 is docked at the battery loading/unloading dock 233 adjacent to the rig platform 229 for loading and unloading transfer of the battery 219 between the cargo transport vessel 228 and the battery charging port 218.

Figure 8:
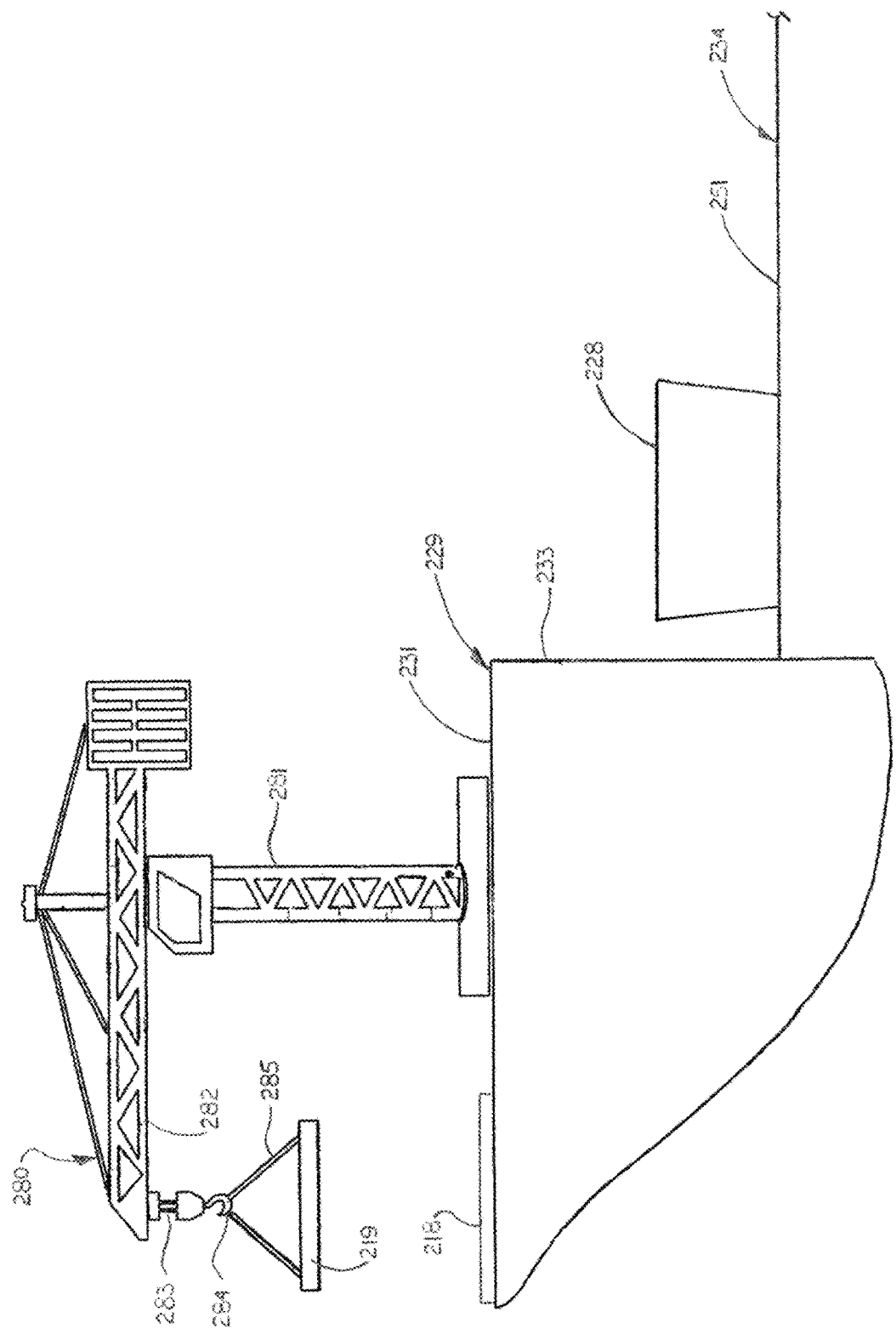
FIG. 8 is a side view of a typical battery loading/unloading crane on the offshore rig platform of an illustrative renewable geothermal energy harvesting offshore rig, with the crane initially hoisting a charged battery from a battery charging port on the platform floor of the rig platform according to some applications of the renewable geothermal energy harvesting offshore rigs.
Figure 9:
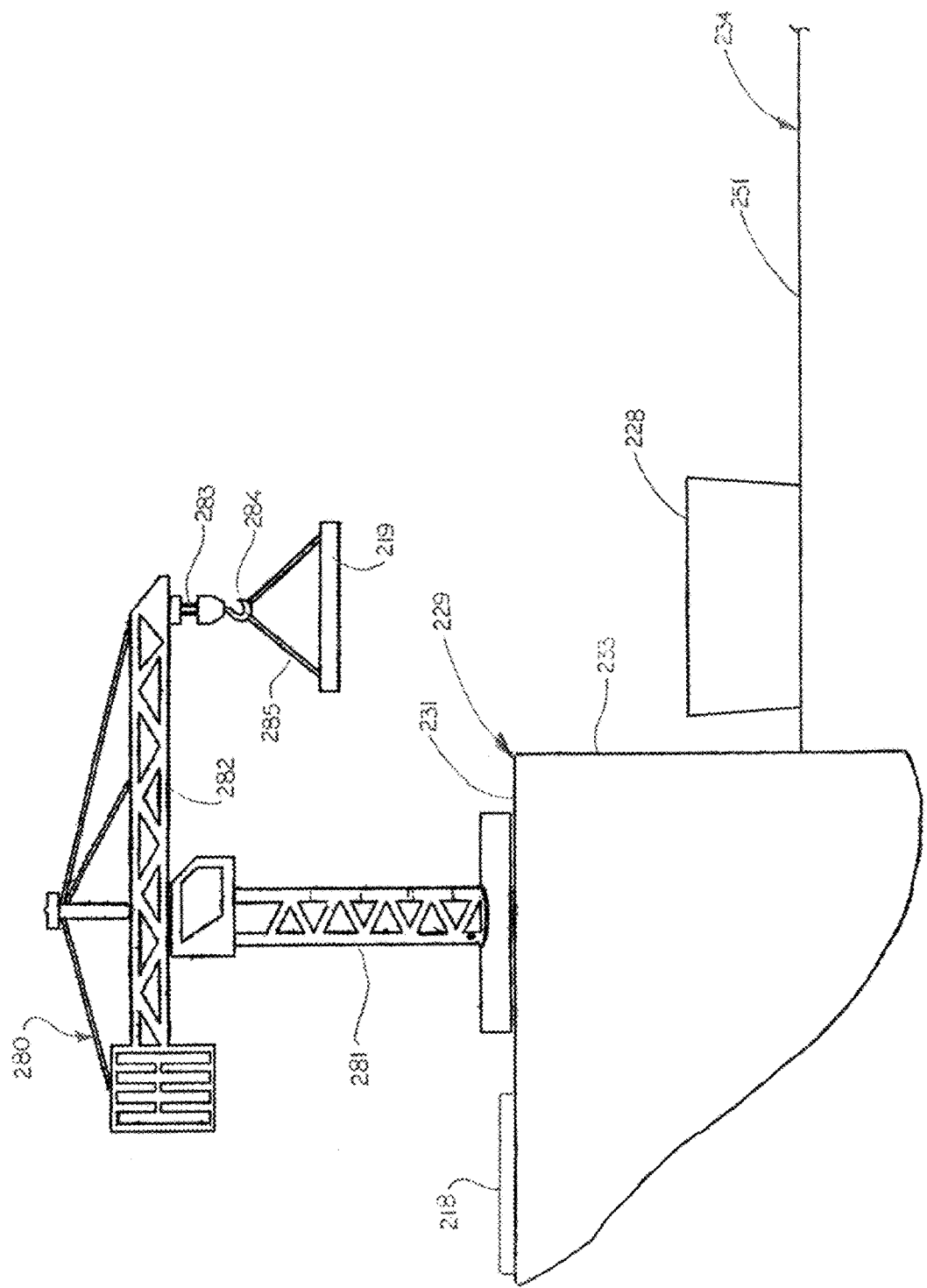
FIG. 9 is a side view of the battery loading/unloading crane subsequently repositioning the charged battery above a cargo transport vessel on the water body preparatory to lowering the battery onto the vessel.
Figure 10:
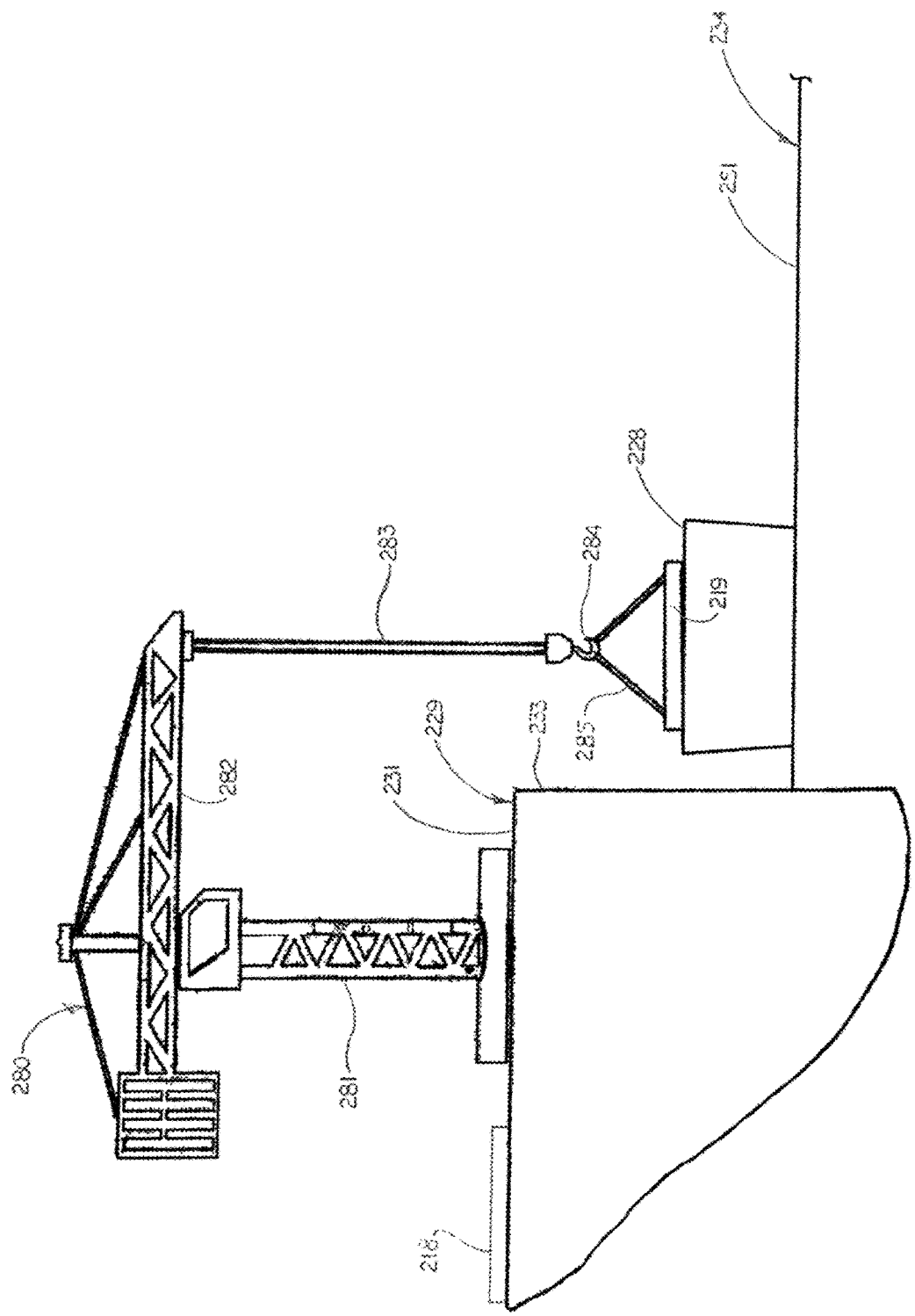
FIG. 10 is a side view of the battery loading/unloading crane subsequently lowering the charged battery onto the cargo transport vessel.

The battery loading/unloading crane 280 may have any design which is suitable for the purpose of transferring the battery 219 between the cargo transport vessel 228 and the battery charging port 218. For example and without limitation, as illustrated in FIGS. 8-10, in some embodiments, the battery loading/unloading crane 280 may include a vertical crane base 281 which extends upwardly from the platform floor 231 of the rig platform 229. A horizontal crane arm 282 may extend from the crane base 281. A crane cable 283, terminated by a crane hook 284, may extend from the crane arm 282. A crane strap 285 may be engaged by the crane hook 284. The crane strap 285 may be configured to releasably engage the battery 219 to facilitate typical initial hoisting and transfer of the electrically depleted battery 219 from the cargo transport vessel 228 to the battery charging port 218 and subsequent hoisting and transfer of the electrically charged battery 219 from the battery charging port 218 back onto the cargo transport vessel 228 typically for electrical powering of the cargo transport vessel 228 and/or transport of the battery 219 on the water body 234.

Figure 7:
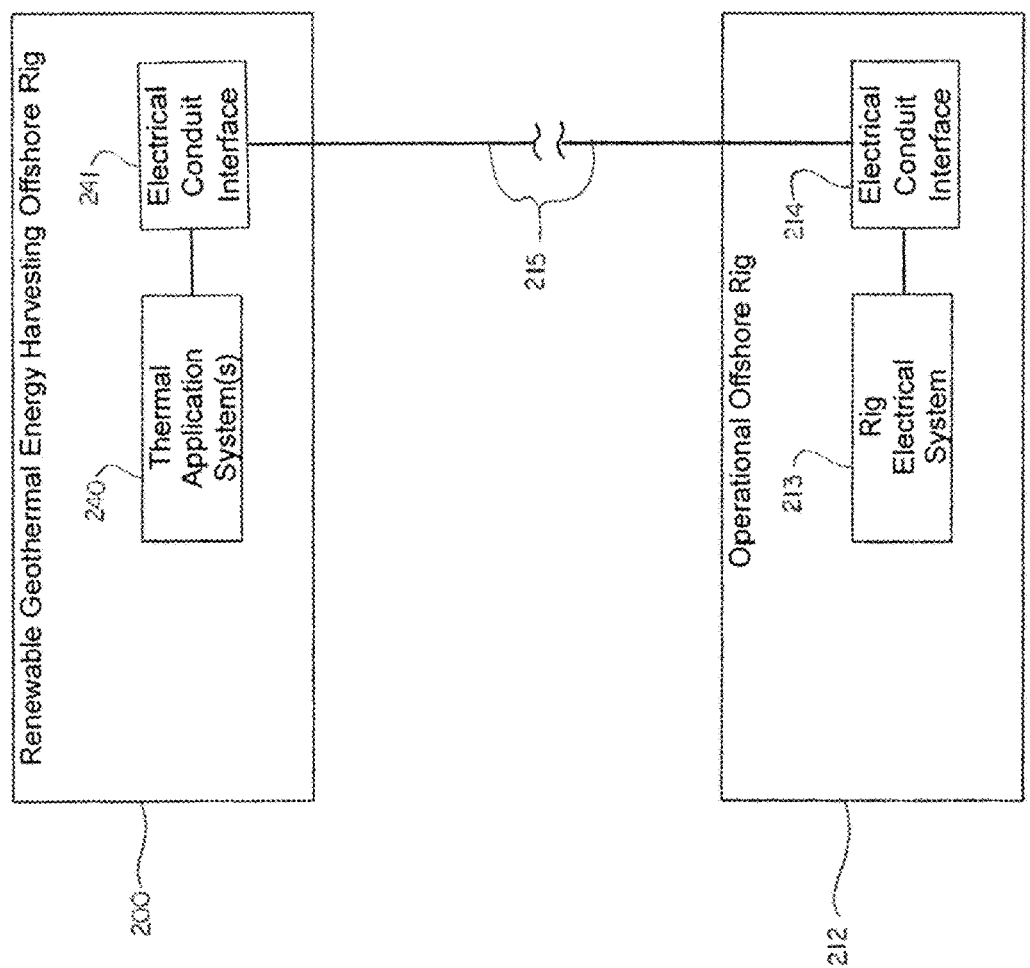
FIG. 7 is a functional block diagram illustrating typical electrical coupling of a thermal application system of an illustrative renewable geothermal energy harvesting offshore rig to an electrical system of an operational offshore rig via an electrical conduit and electrical conduit interfaces to provide electrical power to the operational offshore rig according to some applications of the renewable geothermal energy harvesting offshore rigs.

As illustrated in FIGS. 3 and 7, in some embodiments, the electrical conduit 215 may be deployed to electrically connect at least one operational offshore rig 212 to the rig 200. The rig 200 may be operated to provide electrical power for operation of at least some of the functions of the operational offshore rig 212. Accordingly, as illustrated in FIGS. 2 and 7, at least one electrical conduit interface 241 may electrically interface with the thermal application system 240 of the rig 200. As illustrated in FIG. 7, at least one electrical conduit interface 214 may electrically interface with at least one rig electrical system 213 on the operational offshore rig 212. The rig electrical system 213 may provide at least some of the electrical functions for at least some of the operational systems on the operational offshore rig 212. For example and without limitation, the rig electrical system 213 may include but is not limited to living systems and facilities such as HVAC systems; kitchen lighting, electrical and cooling systems; and/or restroom lighting and electrical systems, as well as electrical systems which may be used in the production, processing and/or storage of hydrocarbons. At least one electrical conduit 215 may electrically couple the electrical conduit interface 241 of the rig 200 to the electrical conduit interface 214 of the operational offshore rig 212. The electrical conduit 215 may include any type of component, element, device or material which is electrically conductive. For example and without limitation, in some embodiments, the electrical conduit 215 may include at least one wire or cable. Accordingly, electrical power generated by the thermal application system 240 of the rig 200 may be transmitted, via the electrical conduit interface 241, the electrical conduit 215 and the electrical conduit interface 214, to the rig electrical system 213 for continued operation of the operational offshore rig 212 and/or some or all of the electrical systems on the operational offshore rig 212. The electrical conduit interface 214 of the offshore operational rig 212 and/or the electrical conduit interface 241 of the rig 200 may include any type of hardwired and/or releasable connection or coupling which is suitable for electrically connecting or coupling the electrical conduit 215 to the rig electrical system 213 and/or the thermal application system 240, respectively, typically according to the knowledge of those skilled in the art.

Figure 11:
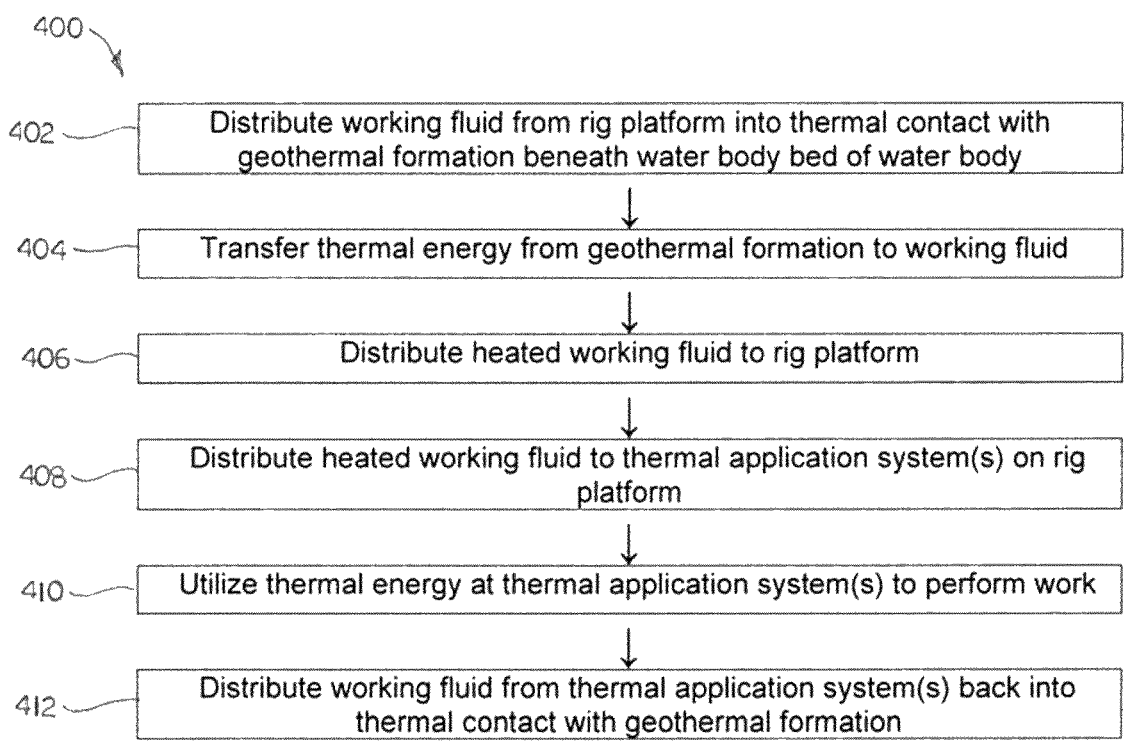
FIG. 11 is a flow diagram of an illustrative embodiment of the offshore renewable geothermal energy harvesting methods.

Referring next to FIG. 11 of the drawings, an illustrative embodiment of the offshore renewable geothermal energy harvesting methods is generally indicated by reference number 400. At Step 402, at least one working fluid may be distributed from an offshore rig platform of a renewable geothermal energy harvesting offshore rig into thermal contact with a geothermal formation beneath a water body bed of a water body.

At Step 404, thermal energy may be transferred from the geothermal formation to the working fluid.

At Step 406, the heated working fluid may be distributed to the rig platform.

At Step 408, the heated working fluid may be distributed to at least one thermal application system on the rig platform.

At Step 410, the thermal energy may be utilized at the thermal application system to perform work.

At Step 412, the working fluid may be distributed from the thermal application system back into thermal contact with the geothermal formation.

Figure 12:
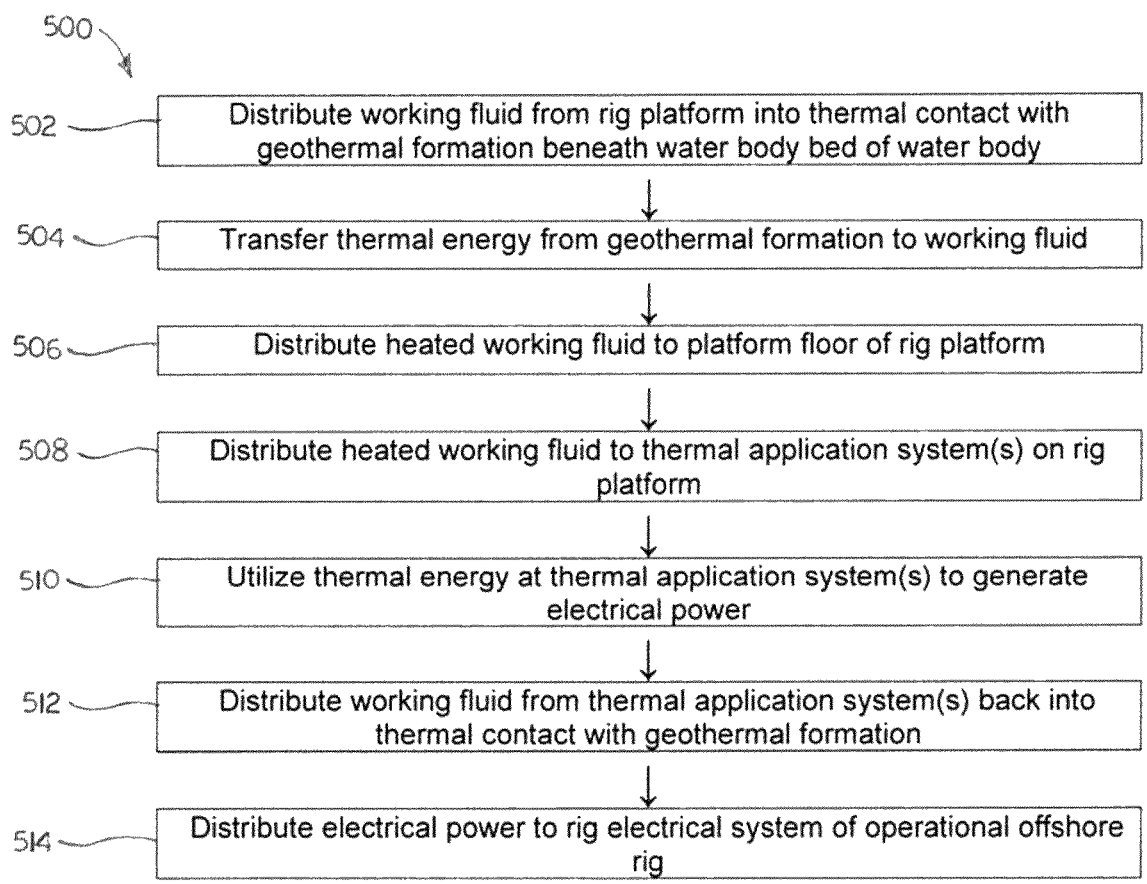
FIG. 12 is a flow diagram of an illustrative embodiment of the offshore renewable geothermal energy harvesting methods in generation of electrical power and distribution of the electrical power to the electrical system of an operational offshore rig.

Referring next to FIG. 12 of the drawings, an illustrative embodiment of the offshore renewable geothermal energy harvesting methods in generation of electrical power and distribution of the electrical power to the electrical system of an operational offshore rig is generally indicated by reference number 500. At Step 502, at least one working fluid may be distributed from an offshore rig platform of a renewable geothermal energy harvesting offshore rig into thermal contact with a geothermal formation beneath a water body bed of a water body.

At Step 504, thermal energy may be transferred from the geothermal formation to the working fluid.

At Step 506, the heated working fluid may be distributed to the rig platform.

At Step 508, the heated working fluid may be distributed to at least one thermal application system on the rig platform.

At Step 510, the thermal energy may be utilized at the thermal application system to generate electrical power.

At Step 512, the working fluid may be distributed from the thermal application system back into thermal contact with the geothermal formation.

At Step 514, the electrical power may be distributed to at least one electrical system of at least one operational offshore rig.

Figure 13:
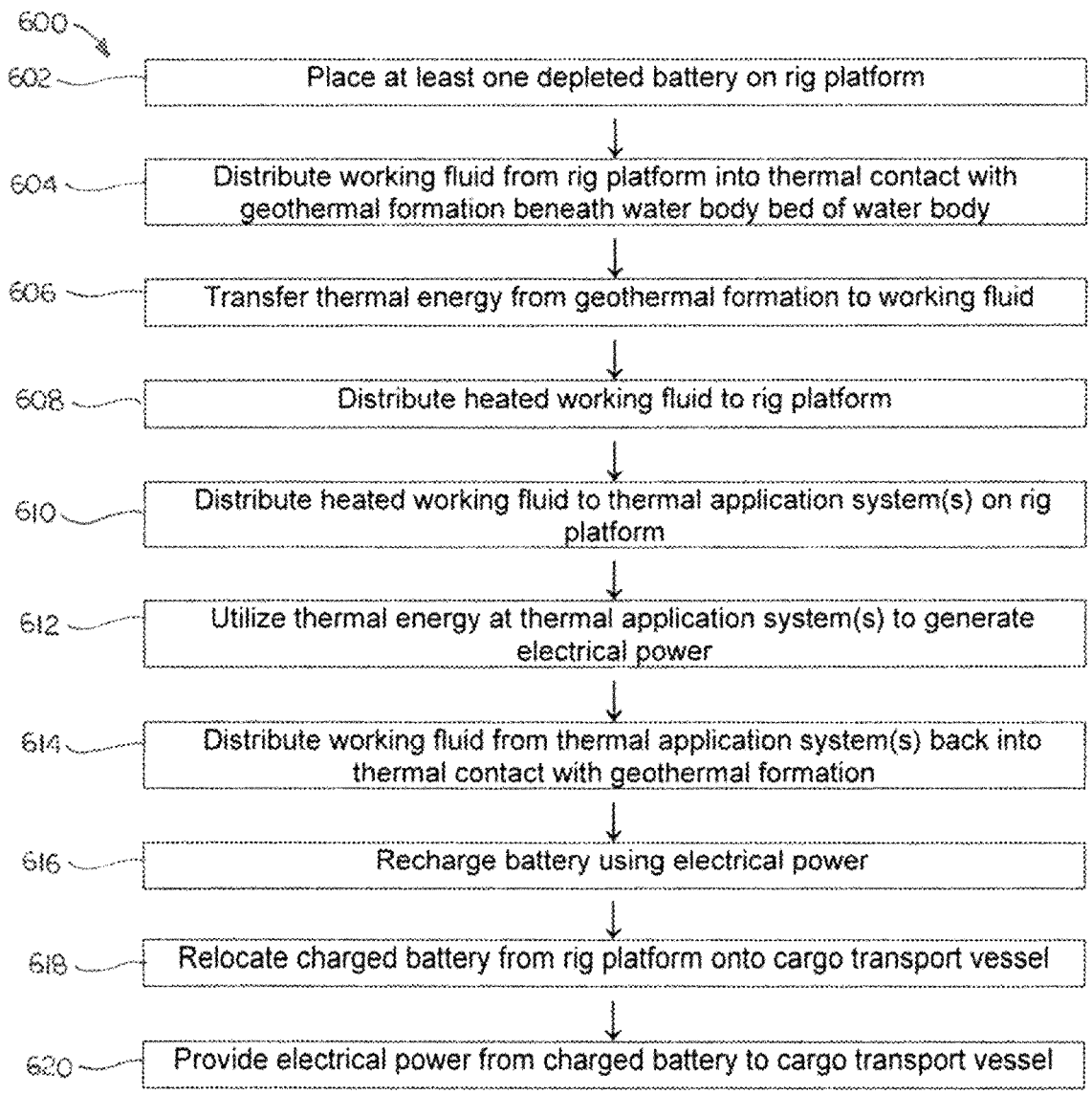
FIG. 13 is a flow diagram of an illustrative embodiment of the offshore renewable geothermal energy harvesting methods in generation of electrical power and recharging of at least one battery using the electrical power for subsequent powering of a cargo transport vessel using the battery.

Referring next to FIG. 13 of the drawings, an illustrative embodiment of the offshore renewable geothermal energy harvesting methods in generation of electrical power and recharging of at least one battery using the electrical power for subsequent transport of the battery to a desired destination on a cargo transport vessel is generally indicated by reference number 600. At Step 602, at least one electrically depleted battery may be placed on an offshore rig platform of a renewable geothermal energy harvesting offshore rig.

At Step 604, at least one working fluid may be distributed from the rig platform of the renewable geothermal energy harvesting offshore rig into thermal contact with a geothermal formation beneath a water body bed of a water body.

At Step 606, thermal energy may be transferred from the geothermal formation to the working fluid.

At Step 608, the heated working fluid may be distributed to the rig platform.

At Step 610, the heated working fluid may be distributed to at least one thermal application system on the rig platform.

At Step 612, the thermal energy may be utilized at the thermal application system to generate electrical power.

At Step 614, the working fluid may be distributed from the thermal application system back into thermal contact with the geothermal formation.

At Step 616, the battery may be recharged using the electrical power.

At Step 618, the recharged battery may be relocated or transferred from the rig platform onto a cargo transport vessel.

At Step 620, electrical power from the charged battery may be provided to the cargo transport vessel for operation of the vessel. Additionally or alternatively, the charged battery may be transported from the rig platform to a selected destination on the cargo transport vessel.

Figure 14:
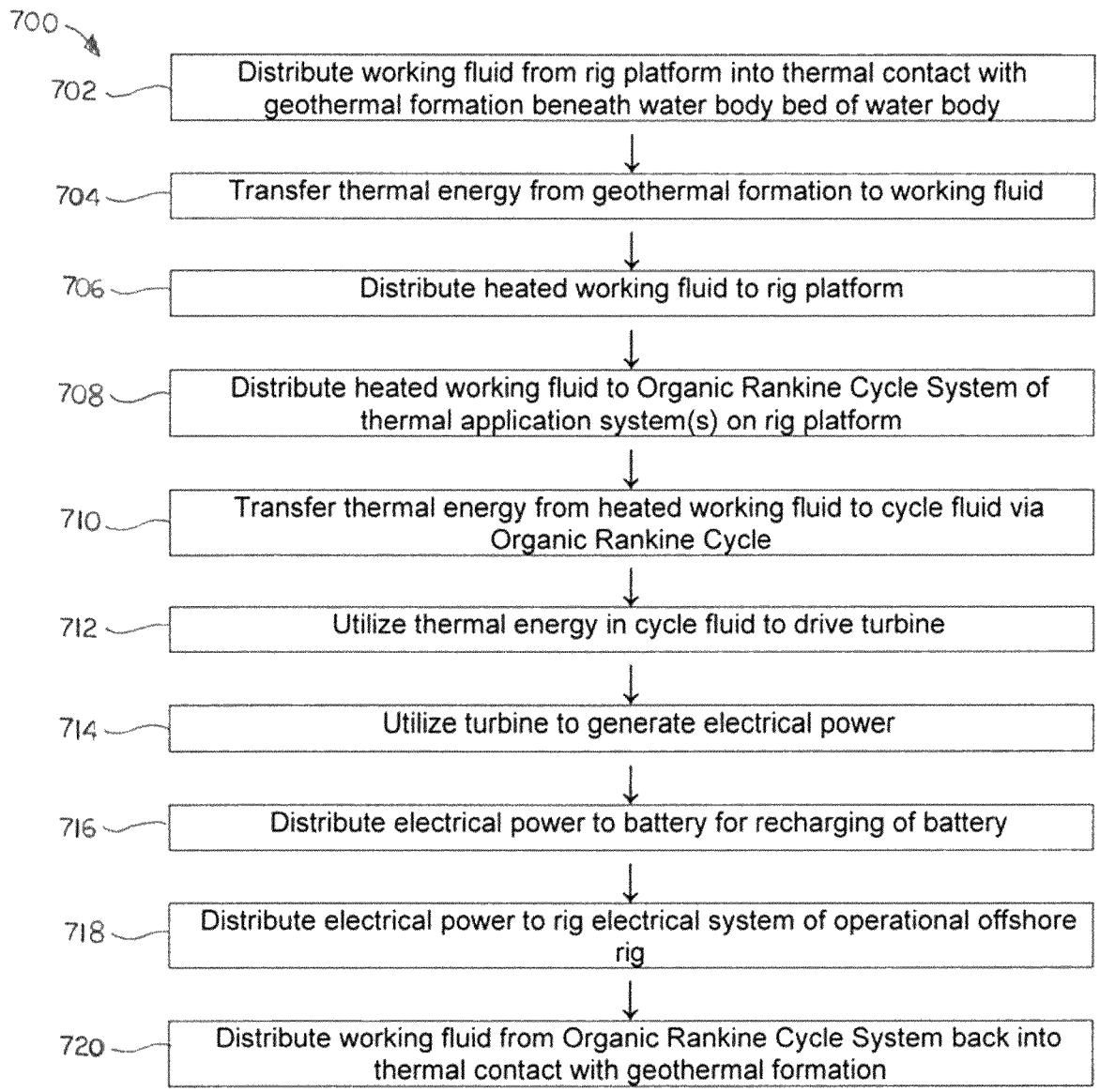
FIG. 14 is a flow diagram of an illustrative embodiment of the offshore renewable geothermal energy harvesting methods in generation of electrical power using an Organic Rankine Cycle (ORC) system.

Referring next to FIG. 14 of the drawings, an illustrative embodiment of the offshore renewable geothermal energy harvesting methods in generation of electrical power using an Organic Rankine Cycle (ORC) system is generally indicated by reference number 700. At Step 702, at least one working fluid may be distributed from the offshore rig platform of the renewable geothermal energy harvesting offshore rig into thermal contact with a geothermal formation beneath a water body bed of a water body.

At Step 704, thermal energy may be transferred from the geothermal formation to the working fluid.

At Step 706, the heated working fluid may be distributed to the rig platform.

At Step 708, the heated working fluid may be distributed to at least one Organic Rankine Cycle (ORC) system of at least one thermal application system on the rig platform.

At Step 710, thermal energy may be transferred from the heated working fluid to a cycle fluid via an Organic Rankine Cycle.

At Step 712, the thermal energy may be utilized in the cycle fluid to drive at least one turbine.

At Step 714, the turbine may be used to generate electrical power.

At Step 716, the electrical power may be distributed to at least one electrically depleted battery for recharging of the battery.

At Step 718, the working fluid may be distributed from the ORC system back into thermal contact with the geothermal formation.

While certain illustrative embodiments of the disclosure have been described above, it will be recognized and understood that various modifications can be made to the embodiments and the appended claims are intended to cover all such modifications which may fall within the spirit and scope of the disclosure.

I claim:

1. An offshore renewable geothermal energy harvesting method for harvesting geothermal energy from a wellhead on at least one offshore rig platform on a water body having a water body bed; a well casing extending downwardly from the wellhead through the rig platform, the water body and the water body bed, respectively, and in thermal contact with at least one subterranean geothermal formation; a fluid flow conduit extending into the well casing and disposed in fluid communication with the wellhead; and a well annulus between the fluid flow conduit and the well casing, the method comprising:

distributing at least one working fluid from the at least one offshore rig platform through the wellhead and a first one of the well annulus and the fluid flow conduit and into thermal contact with the at least one subterranean geothermal formation beneath the water body bed of the water body;

transferring thermal energy from the at least one subterranean geothermal formation to the at least one working fluid;

distributing the at least one working fluid from the at least one subterranean geothermal formation through a second one of the well annulus and the fluid flow conduit and wellhead back to the at least one offshore rig platform;

distributing the at least one working fluid to at least one thermal application system, the at least one thermal application system configured to utilize the thermal energy to perform work; and utilizing the thermal energy at the at least one thermal application system to perform the work.

2. The method of claim 1 wherein the utilizing the thermal energy at the at least one thermal application system to perform the work comprises utilizing the thermal energy of the at least one thermal application system to generate electrical power.

3. The method of claim 2 wherein utilizing the thermal energy of the at least one thermal application system to generate electrical power comprises utilizing the thermal energy of the thermal application system to generate electrical power by driving at least one turbine.

4. The method of claim 2 wherein utilizing the thermal energy of the at least one thermal application system to generate electrical power comprises utilizing the thermal energy of the thermal application system to generate electrical power using at least one Organic Rankine Cycle.

5. The method of claim 2 further comprising recharging at least one battery using the electrical power.

6. The method of claim 5 further comprising relocating the at least one battery from the offshore rig platform to at least one cargo transport vessel.

7. The method of claim 6 wherein relocating the at least one battery from the offshore rig platform to the at least one cargo transport vessel comprises relocating the at least one battery from the offshore rig platform to the at least one cargo transport vessel using at least one battery loading/unloading crane.

8. The method of claim 6 further comprising transporting the at least one battery to at least one land-based facility on the cargo transport vessel.

9. An offshore renewable geothermal energy harvesting method for harvesting geothermal energy from a wellhead on at least one offshore rig platform on a water body having a water body bed; a well casing extending downwardly from the wellhead through the rig platform, the water body and the water body bed, respectively, and in thermal contact with at least one subterranean geothermal formation; a fluid flow conduit extending into the well casing and disposed in fluid communication with the wellhead; and a well annulus between the fluid flow conduit and the well casing, the method comprising:

distributing at least one working fluid from at least one offshore rig platform through the wellhead and a first one of the well annulus and the fluid flow conduit and into thermal contact with the at least one subterranean geothermal formation beneath the water body bed of the water body;

transferring thermal energy from the at least one subterranean geothermal formation to the at least one working fluid;

distributing the at least one working fluid from the at least one subterranean geothermal formation through a second one of the well annulus and the fluid flow conduit and wellhead back to the at least one offshore rig platform;

distributing the at least one working fluid to at least one thermal application system on the at least one offshore rig platform, the at least one thermal application system configured to utilize the thermal energy to generate electrical power;

utilizing the thermal energy at the at least one thermal application system to generate the electrical power;

electrically connecting at least one electrical conduit from the at least one thermal application system to at least one electrical system of at least one operational offshore rig; and distributing the electrical power from the at least one thermal application system through the at least one electrical conduit to the at least one electrical system of the at least one operational offshore rig.

10. The method of claim 9 wherein utilizing the thermal energy of the at least one thermal application system to generate electrical power comprises utilizing the thermal energy of the thermal application system to generate electrical power by driving at least one turbine.

11. The method of claim 9 wherein utilizing the thermal energy of the at least one thermal application system to generate electrical power comprises utilizing the thermal energy of the thermal application system to generate electrical power using at least one Organic Rankine Cycle.

12. The method of claim 9 further comprising recharging at least one battery using the electrical power.

13. The method of claim 12 further comprising relocating the at least one battery from the offshore rig platform to at least one cargo transport vessel.

14. The method of claim 13 wherein relocating the at least one battery from the offshore rig platform to the at least one cargo transport vessel comprises relocating the at least one battery from the offshore rig platform to the at least one cargo transport vessel using at least one battery loading/unloading crane.

15. The method of claim 13 further comprising transporting the at least one battery to at least one land-based facility on the cargo transport vessel.

16. An offshore renewable geothermal energy harvesting rig configured to harvest thermal energy from a subterranean geothermal formation beneath a water body bed of a water body and perform work using the thermal energy, the rig comprising:

an offshore rig platform deployed over a water body surface of the water body;

at least one battery loading/unloading dock disposed along or adjacent to an edge of the offshore rig platform;

a renewable geothermal energy harvesting system comprising:

a wellhead at the offshore rig platform;

a well casing extending downwardly from the wellhead through the rig platform and the water body bed, respectively, into and in thermal contact with the subterranean geothermal formation;

a fluid flow conduit extending into the well casing, the fluid flow conduit disposed in fluid communication with the wellhead;

a well annulus between the fluid flow conduit and the well casing, the well annulus disposed in fluid communication with the wellhead;

a working fluid supply disposed in fluid communication with the wellhead, the working fluid supply configured to contain at least one working fluid; and at least one thermal application system on the offshore rig platform, the at least one thermal application system disposed in fluid communication with the wellhead, the at least one thermal application system configured to utilize the thermal energy to perform the work by generating electrical power;

wherein the wellhead is configured to distribute the at least one working fluid from the water body bed of the water body into thermal contact with the subterranean geothermal formation through a first one of the fluid flow conduit and the well annulus and from the subterranean geothermal formation to the at least one thermal application system through a second one of the fluid flow conduit and the well annulus;

at least one battery charging port on the offshore rig platform, the at least one battery charging port electrically interfacing with the at least one thermal application system; and at least one battery loading/unloading crane disposed on the offshore rig platform in suitable proximity to the battery loading/unloading dock, the at least one battery loading/unloading crane configured to facilitate transfer of at least one battery between the battery charging port and a cargo transport vessel as the cargo transport vessel is docked at the battery loading/unloading dock.

17. The rig of claim 16 wherein the at least one thermal application system comprises at least one turbine.

18. The rig of claim 16 further comprising at least one operational offshore rig comprising at least one rig electrical system electrically interfacing with the at least one thermal application system.

* * * * *